(12) United States Patent
Lin et al.

(10) Patent No.: US 8,899,847 B2
(45) Date of Patent: Dec. 2, 2014

(54) OPTICAL ENGINE ASSEMBLY AND MANUFACTURING METHOD THEREOF

(75) Inventors: FangJeng Lin, Taipei (TW); TsuHsiu Wu, Yilan County (TW); ShihYu Chen, Taichung (TW); ChienChuan Yeh, Taipei (TW); KuangHui Huang, Taichung (TW)

(73) Assignee: Universal Microelectronics Co., Ltd., Taichung (TW)

( * ) Notice: Subject to any disclaimer, the term of this patent is extended or adjusted under 35 U.S.C. 154(b) by 304 days.

(21) Appl. No.: 13/563,893

(22) Filed: Aug. 1, 2012

(65) Prior Publication Data
US 2013/0129287 A1 May 23, 2013

(30) Foreign Application Priority Data
Nov. 18, 2011 (TW) .............................. 100142238 A

(51) Int. Cl.
*G02B 6/36* (2006.01)
*G02B 6/42* (2006.01)

(52) U.S. Cl.
CPC ............ *G02B 6/4214* (2013.01); *G02B 6/4249* (2013.01)
USPC ......................................................... 385/89

(58) Field of Classification Search
USPC ........................................................... 385/89
See application file for complete search history.

(56) References Cited

U.S. PATENT DOCUMENTS

| | | | | |
|---|---|---|---|---|
| 5,671,315 A * | 9/1997 | Tabuchi et al. | ................. | 385/137 |
| 5,970,200 A * | 10/1999 | Takikawa et al. | ............. | 385/137 |
| 6,048,107 A * | 4/2000 | Pubanz | ........................... | 385/92 |
| 6,227,723 B1 * | 5/2001 | Masuda et al. | .................. | 385/88 |
| 6,250,820 B1 * | 6/2001 | Melchior et al. | ................ | 385/89 |
| 6,263,137 B1 * | 7/2001 | Yoneyama et al. | ............. | 385/49 |
| 6,467,972 B2 * | 10/2002 | Setoguchi | ........................ | 385/88 |
| 6,775,440 B2 * | 8/2004 | Kishida et al. | .................. | 385/49 |
| 6,848,839 B2 * | 2/2005 | Steinberg | ........................ | 385/88 |
| 6,883,977 B2 * | 4/2005 | Dautartas et al. | ............... | 385/92 |
| 7,404,679 B2 * | 7/2008 | Ebbutt et al. | .................... | 385/78 |
| 2001/0033722 A1 * | 10/2001 | Okada et al. | .................... | 385/94 |
| 2006/0233497 A1 * | 10/2006 | Hoshino et al. | ................. | 385/88 |

* cited by examiner

*Primary Examiner* — Sung Pak
(74) *Attorney, Agent, or Firm* — Lowe Hauptman & Ham, LLP

(57) ABSTRACT

There is provided an optical engine assembly including an active unit and a transmission unit. The active unit includes a first bearing member configured to carry an optoelectronic unit. The transmission unit includes a second bearing member configured to fix a plurality of optical waveguides. The optoelectronic unit is optically coupled to the optical waveguides. The first bearing member and the second bearing member have symmetrical structures. The present disclosure further provides a manufacturing method of an optical engine assembly.

15 Claims, 10 Drawing Sheets

OPTICAL ENGINE ASSEMBLY AND MANUFACTURING METHOD THEREOF

CROSS REFERENCE TO RELATED APPLICATION

This application claims the priority benefit of Taiwan Patent Application Serial Number 100142238, filed on Nov. 18, 2011, the full disclosure of which is incorporated herein by reference.

BACKGROUND

1. Field of the Disclosure

This disclosure generally relates to an optoelectronic conversion device and, more particularly, to an optical engine assembly and manufacturing method thereof capable of reducing the alignment complexity and improving the alignment accuracy.

2. Description of the Related Art

Good alignment between the optical fiber and the laser light source or photodetector can improve the coupling efficiency of light transmission. Due to the increase of the transmission capacity, how to improve the light coupling between a plurality of optical fibers and a plurality of laser light sources or photodetectors becomes an important issue.

Please refer to FIG. 1, it shows a schematic diagram of a conventional optical engine assembly 9, which includes a substrate 91, a supporting member 92, a light redirecting element 93, an optoelectronic device 94 and a plurality of conductive lines 95. The optoelectronic device 94 is disposed on an upper surface of the substrate 91 and configured to generate or receive optical signals transmitting along a normal direction n of the substrate 91. The conductive lines 95 are formed on the upper surface of the substrate 91 and electrically coupled to the optoelectronic device 94 so as to transmit electrical signals to and from the optoelectronic device 94. The supporting member 92 is configured to support the light redirecting element 93 such that the light redirecting element 93 can be aligned with the optoelectronic device 94. The light redirecting element 93 redirects optical signals transmitting in a direction along the normal direction n to a direction parallel to the upper surface of the substrate 91 and the redirected optical signals are transmitted to an external optical connector.

Please refer to FIG. 2, it shows a bottom view of the light redirecting element 93 of FIG. 1, wherein a plurality of V-grooves 931 are formed in parallel at a bottom surface of the light redirecting element 93. A plurality of optical fibers 932 are respectively placed in the V-grooves 931 and an adhesive 933 is used to fix the optical fibers 932 inside the V-grooves 931. The optical fibers 932 are finally connected to an optical connector so as to transmit optical signals generated by the optoelectronic device 94 to outside of the optical engine assembly 9 or to transmit external optical signals to the optoelectronic device 94.

Please refer to FIG. 3, it shows a cross-sectional view taken along line III-III' of the optical engine assembly 9 of FIG. 1. In the optical engine assembly 9, the light redirecting element 93 is configured to redirect vertical optical signals generated from the optoelectronic device 94 to horizontal optical signals or to redirect horizontal optical signals to vertical optical signals to be received by the optoelectronic device 94. The redirecting mechanism is to form a mirror surface 932S at the front end of the optical fibers 932, and the mirror surface 932 has a 45-degree beveled surface with respect to the normal direction n so as to reflect optical signals. However, in the alignment of the light redirecting element 93 and the optoelectronic device 94, the mirror surface 932S has to be exactly aligned with the optoelectronic device 94 such that a three-dimensional alignment (including the longitudinal alignment, transverse alignment and rotation alignment) has to be performed. Therefore, this structure has a complicated manufacturing process and it is difficult to effectively improve the alignment accuracy thereof.

Accordingly, the present disclosure further provides an optical engine assembly and manufacturing method thereof that can simplify the alignment complexity and improve the alignment accuracy and coupling efficiency.

SUMMARY

It is an object of the present disclosure to provide an optical engine assembly and manufacturing method thereof capable of reducing the alignment complexity during manufacturing process.

It is another object of the present disclosure to provide an optical engine assembly and manufacturing method thereof capable of increasing the alignment accuracy and the coupling efficiency.

To achieve the above objects, the present disclosure provides an optical engine assembly including an active unit and a transmission unit. The active unit includes a first bearing member and an optoelectronic unit. The first bearing member includes a coupling part, a first fixing part and a first supporting part, wherein a first groove is longitudinally formed on the coupling part, a plurality of V-grooves are longitudinally formed on the first fixing part and connected to the first groove, and a second groove is longitudinally formed on the first supporting part and connected to the V-grooves. The optoelectronic unit is disposed in the first groove of the coupling part and includes a plurality of optoelectronic chips. The transmission unit includes a second bearing member, a plurality of optical waveguides and a mount. The second bearing member includes a second fixing part and a second supporting part, wherein the second fixing part and the second supporting part are respectively symmetric to the first fixing part and the first supporting part of the first bearing member, and a plurality of V-grooves and a second groove are respectively formed on the second fixing part and the second supporting part. The optical waveguides are placed in the V-grooves and the second groove of the second bearing member, and a 45-degree beveled mirror surface is respectively formed at front ends of the optical waveguides and aligned with the optoelectronic chips of the optoelectronic unit. The mount includes a plurality of through holes to allow the optical waveguides to penetrate through. The first fixing part and the first supporting part of the first bearing member and the second fixing part and the second supporting part of the second bearing member are formed by the same manufacturing process.

The present disclosure further provides a manufacturing method of an optical engine assembly including the steps of: providing a first bearing member and a second bearing member identical with each other, wherein a coupling part, a fixing part and a supporting part are formed on both the first bearing member and the second bearing member, a first groove is longitudinally formed on the coupling parts, a plurality of V-grooves are longitudinally formed on the fixing parts, and a second groove is longitudinally formed on the supporting parts; disposing an optoelectronic unit in the first groove of the coupling part of the first bearing member to form an active unit, wherein the optoelectronic unit comprises a plurality of optoelectronic chips; removing the coupling part of the second bearing member; providing a plurality of optical waveguides to be fixed in the V-grooves and the second groove of the second bearing member; grinding front ends of the fixing part of the second bearing member and the optical waveguides to respectively form a 45-degree beveled front end and 45-degree beveled surfaces; forming a 45-degree beveled mirror surface on the 45-degree beveled surfaces of the optical waveguides; providing a mount including a plurality of through holes to allow the optical waveguides to penetrate through to form a transmission unit; and combining the transmission unit to the active unit and aligning the 45-degree beveled mirror surfaces with the optoelectronic chips.

In the optical engine assembly and manufacturing method of the present disclosure, at least one pair of positioning grooves are further formed transversely on the coupling part of the first bearing member.

In the optical engine assembly and manufacturing method of the present disclosure, the optoelectronic chips of the optoelectronic unit are aligned with the positioning grooves transversely.

In the optical engine assembly and manufacturing method of the present disclosure, the optoelectronic chips are respectively aligned with the V-grooves longitudinally.

In the optical engine assembly and manufacturing method of the present disclosure, a front edge of the 45-degree beveled front end of the fixing part is aligned with the positioning grooves transversely.

The optical engine assembly of the present disclosure only has to perform a one-dimensional alignment thereby having lower manufacturing complexity. In addition, the first bearing member and the second bearing member are made by the same manufacturing process in order to effectively improve the alignment accuracy and the coupling efficiency.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
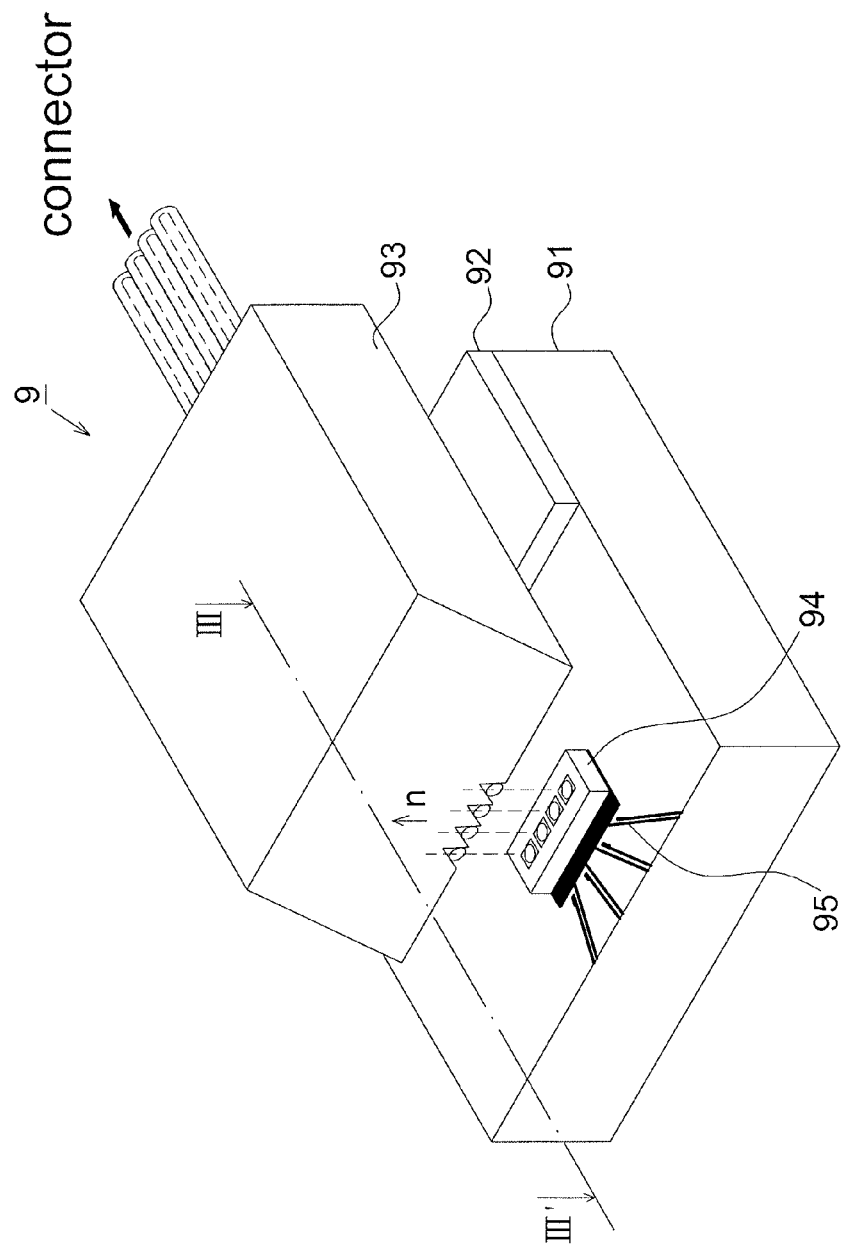
FIG. 1 shows a schematic diagram of a conventional optical engine assembly.
Figure 2:
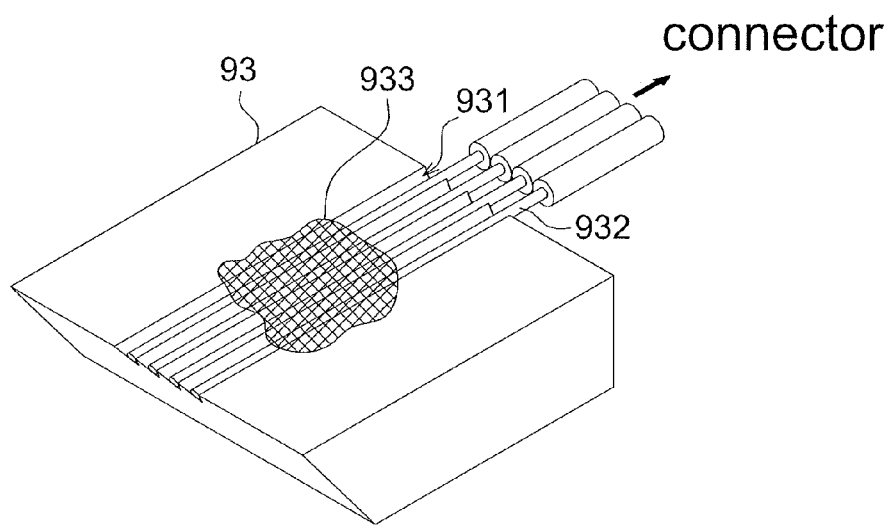
FIG. 2 shows a bottom view of the light redirecting element of the optical engine assembly of FIG. 1.
Figure 3:
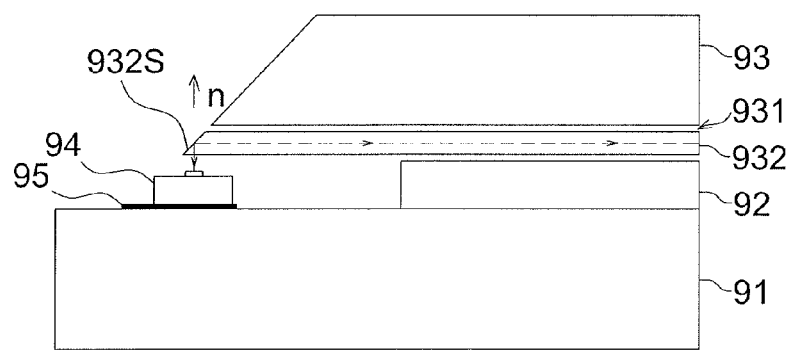
FIG. 3 shows a cross-sectional view taken along line of the optical engine assembly of FIG. 1.
Figure 4:
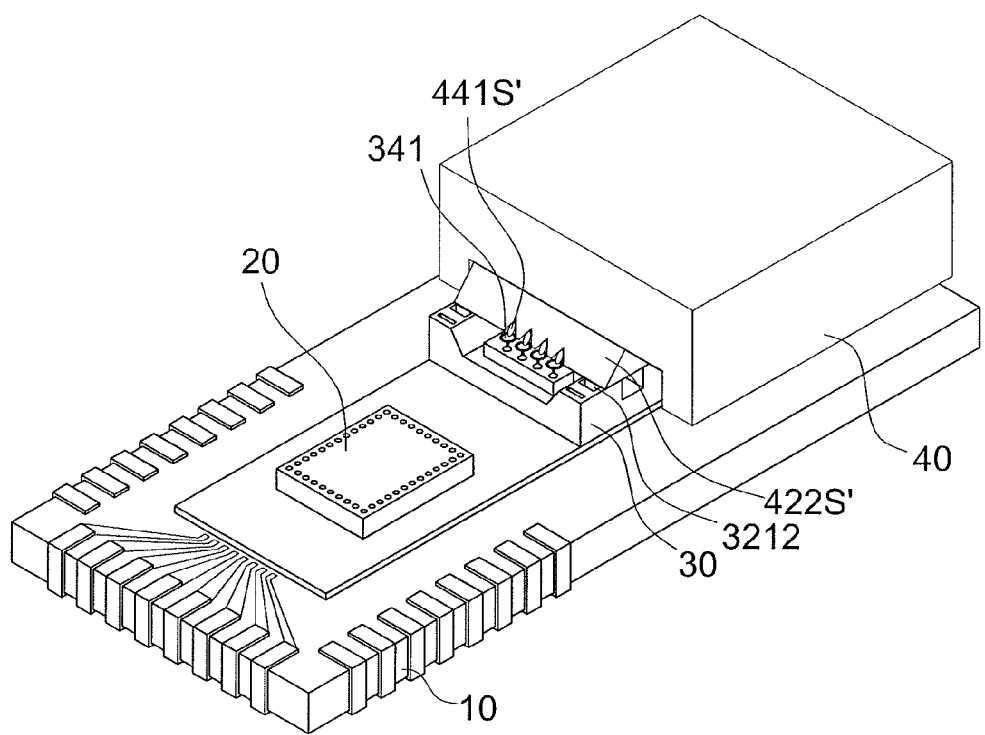
FIG. 4 shows a schematic diagram of the optical engine assembly according to an embodiment of the present disclosure.
Figure 5:
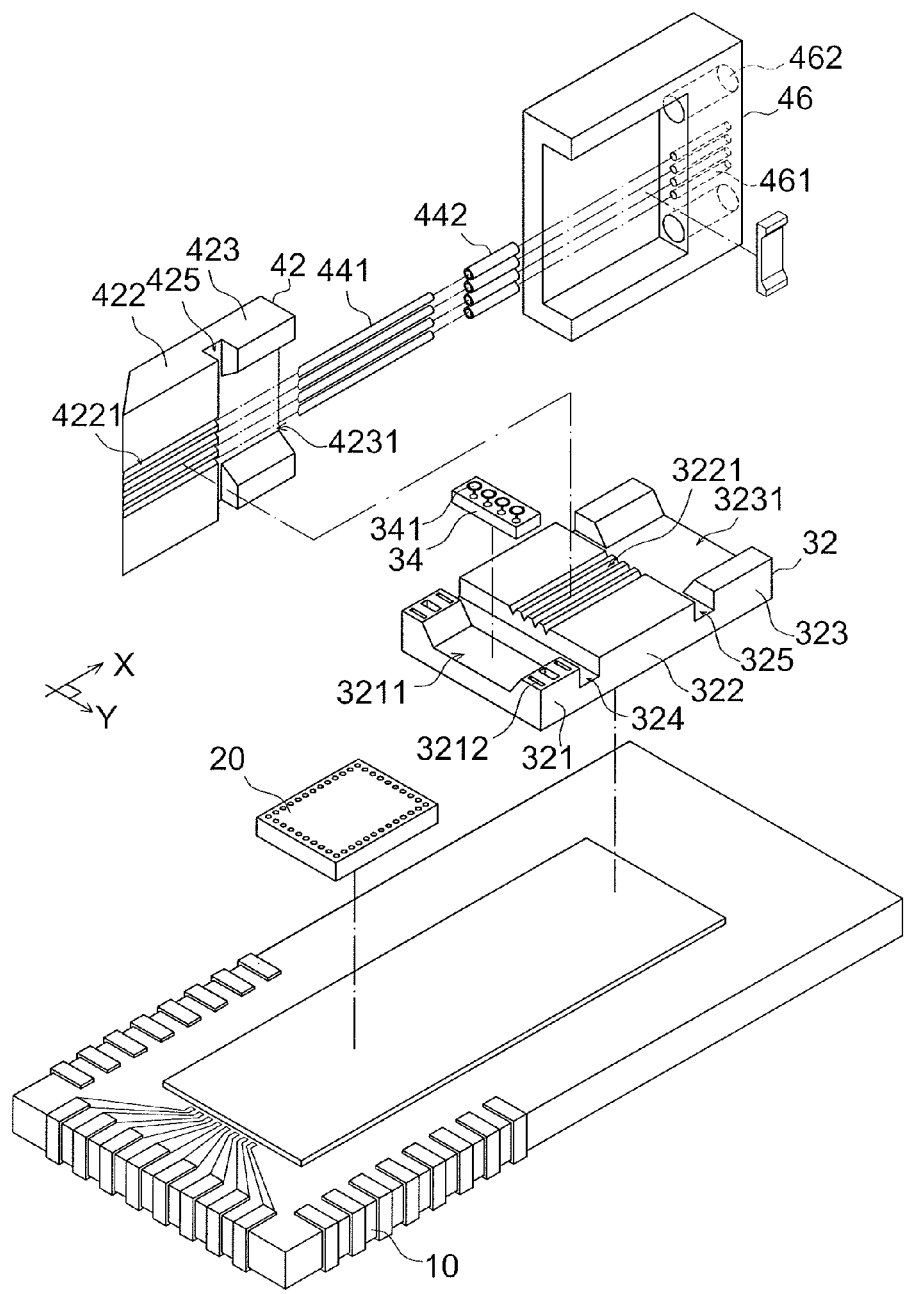
FIG. 5 shows an exploded diagram of the optical engine assembly according to the embodiment of the present disclosure.

Please refer to FIGS. 4 and 5, FIG. 4 shows a schematic diagram of the optical engine assembly according to an embodiment of the present disclosure and FIG. 5 shows an exploded diagram of the optical engine assembly according to the embodiment of the present disclosure. The optical engine assembly of the present disclosure includes a substrate 10, a control chip 20, an active unit 30 and a transmission unit 40.

The substrate 10 may be a PCB substrate and is configured to provide the power needed by the control chip 20 and the active unit 30 during operation. One or a plurality of layers of traces and contact holes are formed on the substrate 10 configured to transmit power and electrical signals, wherein the method of forming the traces and contact holes on a substrate are well known and illustrated in literatures, and thus details thereof will not be illustrated herein.

The control chip 20 is attached to the substrate 10 and electrically coupled to the traces on the substrate 10. The control chip 20 is configured to output electrical signals to the active unit 30 or to receive electrical signals from the active unit 30, wherein the control chip 20 may be attached to the substrate 10 in a suitable method as long as the control chip 20 is electrically coupled to the substrate 10 and the active unit 30.

The active unit 30 includes a first bearing member 32 and an optoelectronic unit 34. The first bearing member 32 is preferably a silicon substrate and may be attached to the substrate 10 using an adhesive, a fastening member or other fixing members. The first bearing member 32 includes a coupling part 321, a first fixing part 322 and a first supporting part 323, wherein the coupling part 321 and the first fixing part 322 are separated by a first connecting groove 324, and the first fixing part 322 and the first supporting part 323 are separated by a second connecting groove 325; that is, the coupling part 321, the first fixing part 322 and the first supporting part 323 are respectively formed as a part of the first bearing member 32 along a longitudinal direction (e.g. the X direction shown in the figure). The first connecting groove 324 and the second connecting groove 325 extends along a transverse direction (e.g. the Y direction shown in the figure) configured to separate the coupling part 321, the first fixing part 322 and the first supporting part 323.

A first groove 3211 is formed, e.g. by etching along the longitudinal direction on the coupling part 321 and connected to the first connecting groove 324, wherein the first groove 3211 is substantially located at the center of the coupling part 321. At least one pair of positioning grooves 3212 (for example, but not limited to, three pairs of positioning grooves are shown herein) are respectively formed at two sides, each side with one of a pair of the positioning grooves, of the first groove 3211, wherein a length direction of the positioning grooves 3212 preferably extends along the transverse direction, and the positioning grooves 3212 may or may not connect to the first groove 3211. The optoelectronic unit 34 is disposed inside the first groove 3211, includes a plurality of optoelectronic chips 341 to generate or receive optical signals, includes electrodes coupled to the optoelectronic chips 341, and is electrically coupled to the control chip 20 via the traces formed on the substrate 10 or via wire bonding. The optoelectronic chips 341 may be laser chips or photodetectors, wherein a pitch between center lines of the optoelectronic chips 341 is preferably equal to 250 micrometers; that is, equal to a pitch between fibers in a fiber ribbon. It is appreciated that the optoelectronic chips 341 are substantially arranged in a line along the transverse direction, and the positioning grooves 3212 are formed on the coupling part 321 corresponding to different types of the optoelectronic unit 34 for alignment purpose. Therefore, when there are several pairs of positioning grooves 3212 formed on the coupling part 321, the optical engine assembly of the present disclosure may be adapted to several types of the optoelectronic unit 34.

A plurality of V-grooves 3221 are formed, e.g. by etching on the first fixing part 322 along the longitudinal direction and connect both the first connecting groove 324 and the second connecting groove 325. A pitch between the V-grooves 3221 is preferably equal to 250 micrometers, and the V-grooves 3221 are configured to place a bare fiber. Therefore, a size of the V-grooves 3221 is preferably selected to be able to accommodate a bare fiber.

A supporting groove 3231 is formed, e.g. by etching on the first supporting part 323 along the longitudinal direction and connected to the second connecting groove 325. The supporting groove 3231 is configured to support optical waveguides (described later). In the present disclosure the second groove 3231 and the first groove 3211 are preferably formed by the same manufacturing process such that they may have substantially identical widths and depths, wherein said depths may be determined according to the size of the optoelectronic unit 34 disposed inside the first groove 3211.

In the active unit 30 of the present disclosure, when attaching the optoelectronic unit 34 to the first bearing member 32, preferably each of the optoelectronic chips 341 of the optoelectronic unit 34 is respectively aligned with each of the V-grooves 3221 on the first fixing part 322 along the longitudinal direction and is aligned with the positioning grooves 3212 on the coupling part 321 along the transverse direction. In this manner, after the disposition of the optoelectronic unit 34 is accomplished, a two-dimensional alignment (i.e. the transverse alignment and rotation alignment) is simultaneously accomplished. Numbers of the optoelectronic chips 341 and the V-grooves 3221 may be determined according to the number of the channel to be transmitted and are not limited to those shown in FIG. 5. The first connecting groove 324 is configured to connect the first groove 3211 and the V-grooves 3221, and the second connecting groove 325 is configured to connect the V-grooves 3221 and the second groove 3231, and thus a shape of the cross section of the first connecting groove 324 and the second connecting groove 325 has no particular limitation.

The transmission unit 40 includes a second bearing member 42 (more precisely a part of the second bearing member 42), a plurality of optical waveguides 441 and a mount 46. The second bearing member 42 and the first bearing member 32 are previously made by the same manufacturing process, and thus the second bearing member 42 also includes a second fixing part 422 symmetric to the first fixing part 322 and a second supporting part 423 symmetric to the first supporting part 323, wherein the coupling part of the second bearing member 42 is removed during manufacturing (described later). Similarly, a plurality of V-grooves 4221 are formed, e.g. by etching on the second fixing part 422 along the longitudinal direction; a supporting groove 4231 is formed, e.g. by etching on the second supporting part 423 along the longitudinal direction; and the V-grooves 4221 and the supporting groove 4231 are connected with each other via a second connecting groove 425 extending along the transverse direction.

The optical waveguides 441 may be bare fibers, and the front section closing to a front end thereof is placed in the V-grooves 4221 and preferably is fixed inside the V-grooves 4221 using an adhesive. A section of the optical waveguides 441 is preferably surrounded by a fiber ribbon 442, wherein the section of the optical waveguides 441 surrounded by the fiber ribbon 442 is placed in the second groove 4231 of the second supporting part 423; i.e. the second supporting part 423 is configured to support the fiber ribbon 442. The mount 46 has a plurality of (e.g. four are shown herein) though holes 461 and a plurality of (e.g. two are shown herein) dowel pin holes 462. The through holes 461 are configured to allow the other end of the optical waveguides 441 to penetrate through to be fixed, and preferably a diameter of the through holes 461 is substantially identical to that of the bare fiber, e.g. 125 micrometers. A pitch between the through holes 461 is preferably, but not limited to, 250 micrometers, and may be determined according to the optical waveguides actually used. The dowel pin holes 462 are configured to combine with the dowel pin (not shown) of an external optical connector. It is appreciated that if the mount 46 is not connected to an external optical connector using the dowel pin, the mount 46 may not have the dowel pin holes 462.

Figure 6:
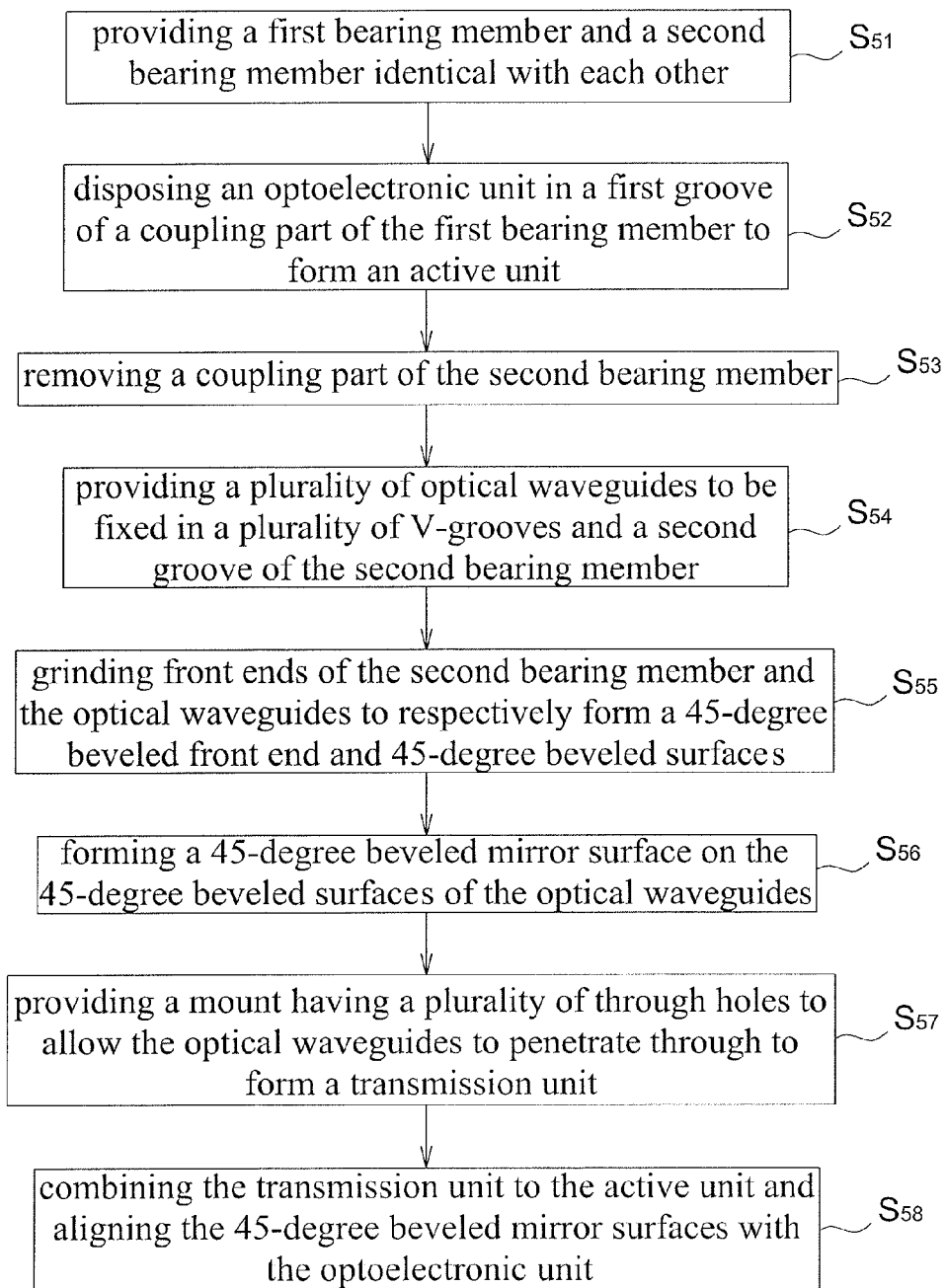
FIG. 6 shows a flow chart of manufacturing the optical engine assembly according to the embodiment of the present disclosure.

Please refer to FIG. 6, it shows a flow chart of manufacturing the optical engine assembly according to the embodiment of the present disclosure, which includes the steps of: providing a first bearing member and a second bearing member identical with each other (Step $S_{51}$); disposing an optoelectronic unit in a first groove of a coupling part of the first bearing member to form an active unit (Step $S_{52}$); removing a coupling part of the second bearing member (Step $S_{53}$); providing a plurality of optical waveguides to be fixed in a plurality of V-grooves and a second groove of the second bearing member (Step $S_{54}$); grinding front ends of the second bearing member and the optical waveguides to respectively form a 45-degree beveled front end and 45-degree beveled surfaces (Step $S_{55}$); forming a 45-degree beveled mirror surface on the 45-degree beveled surfaces of the optical waveguides (Step $S_{56}$); providing a mount having a plurality of through holes to allow the optical waveguides to penetrate through to form a transmission unit (Step $S_{57}$); and combining the transmission unit to the active unit and aligning the 45-degree beveled mirror surfaces with the optoelectronic unit (Step $S_{58}$).

Please refer to FIGS. 6 to 9E, the manufacturing method of the optical engine assembly according to the present disclosure will be illustrated hereinafter.

Figure 7:
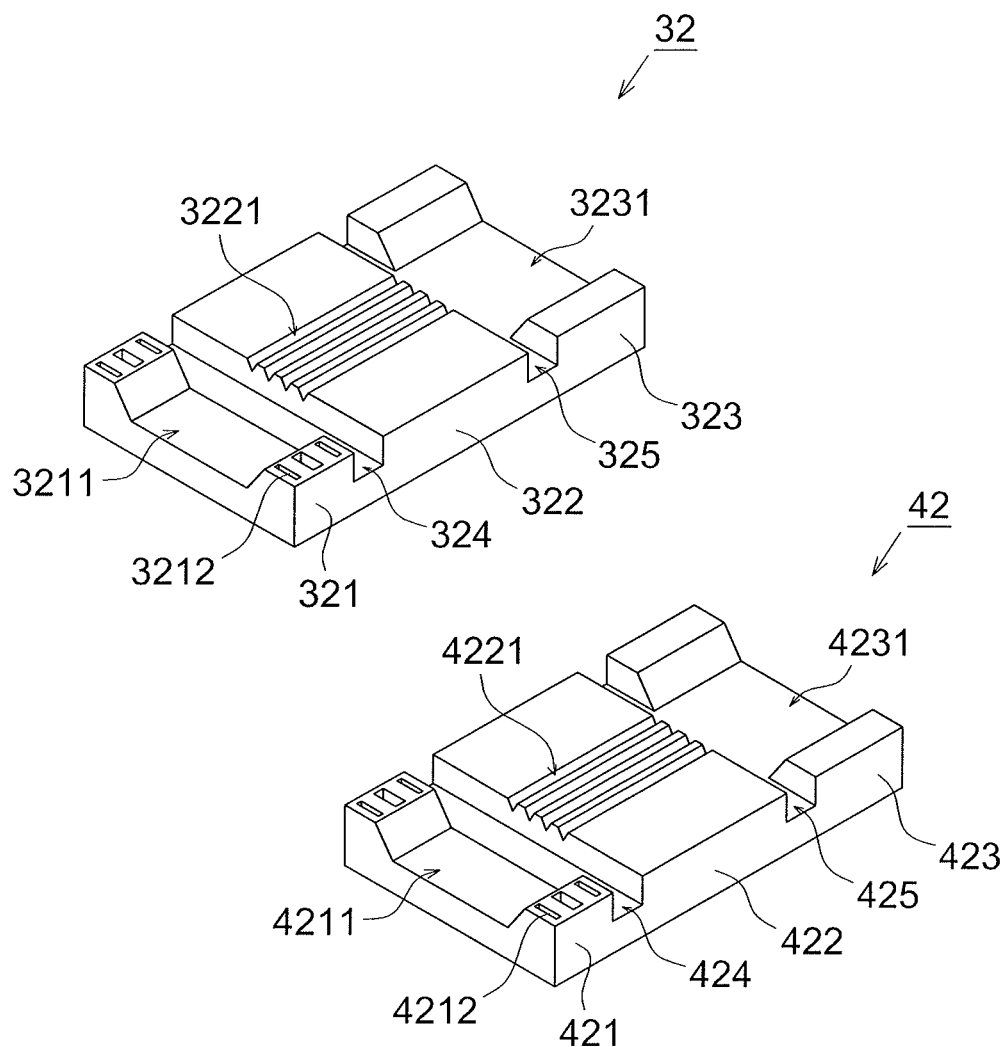
FIGS. 7-9E show schematic diagrams of manufacturing the optical engine assembly according to the embodiment of the present disclosure.

Please refer to FIG. 7, a first bearing member 32 and a second bearing member 42 that are identical with each other are provided first. A first connecting groove 324 and a second connecting groove 325 are previously formed, e.g. by etching on the first bearing member 32 so as to divide the first bearing member 32 into a coupling part 321, a first fixing part 322 and a first supporting part 323. Furthermore, a first groove 3211 and at least one pair of positioning grooves 3212 are previously formed, e.g. by etching on the coupling part 321; a plurality of V-grooves 3221 are previously formed, e.g. by etching on the first fixing part 322; and a second groove 3231 is previously formed, e.g. by etching on the first supporting part 323. On the second bearing member 42 there are also formed a first connecting groove 424, a second connecting groove 425, a first groove 4211, at least one pair of positioning grooves 4212, a plurality of V-grooves 4221 and a second groove 4231 using the same manufacturing process as forming the first bearing member 32 (Step $S_{51}$). In other words, the first bearing member 32 and the second bearing member 42 provided in this step have symmetrical structures.

Figure 8:
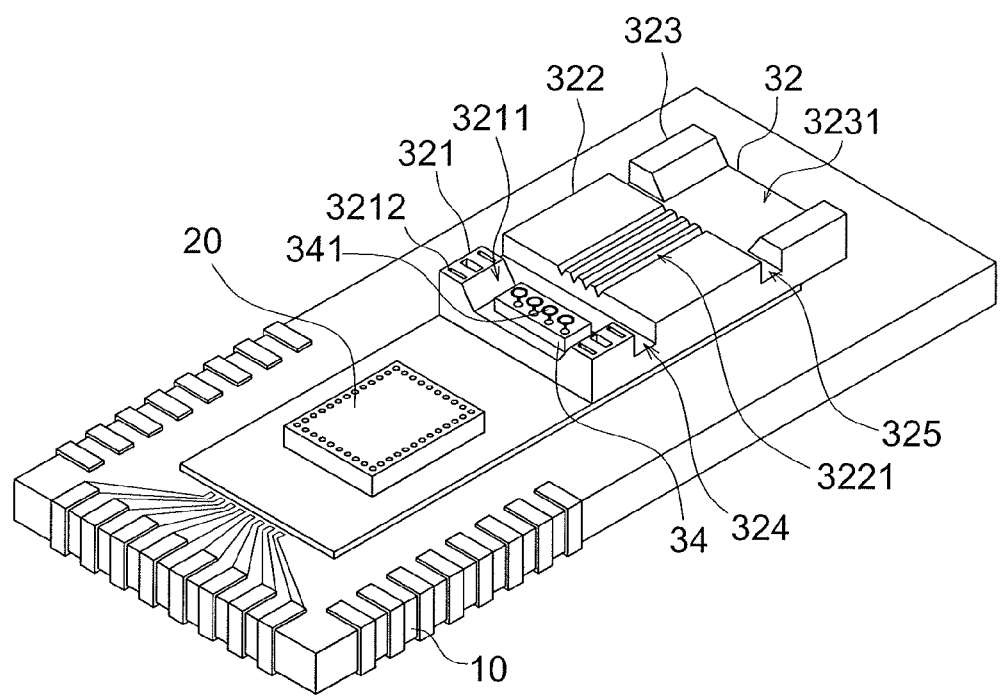

Please refer to FIG. 8, next an optoelectronic unit 34 is disposed in the first groove 3211 of the first bearing member 32 so as to form the active unit 30 referred herein (Step $S_{52}$), wherein a plurality of optoelectronic chips 341 and electrodes electrically coupled to the optoelectronic chips 341 are previously formed on the optoelectronic unit 34, and the optoelectronic unit 34 may be a commercial device or a customized device. As mentioned above, the optoelectronic unit 34 is disposed in a way such that the optoelectronic chips 341 are aligned with the V-grooves 3221 longitudinally and aligned with the positioning grooves 3212 transversely. Next, the active unit 30 is attached to a substrate 10 and electrically coupled to the substrate 10 and a control chip 20 attached to the substrate 10. It should be mentioned that in this step the first bearing member 32 may be attached to the substrate 10 before or after the optoelectronic unit 34 is disposed thereon. In addition, the sequence of attaching the active unit 30 and the control chip 20 to the substrate 10 does not have particular limitation as long as the control chip 20 and the active unit 30 are electrically coupled to each other.

Figure 9A:
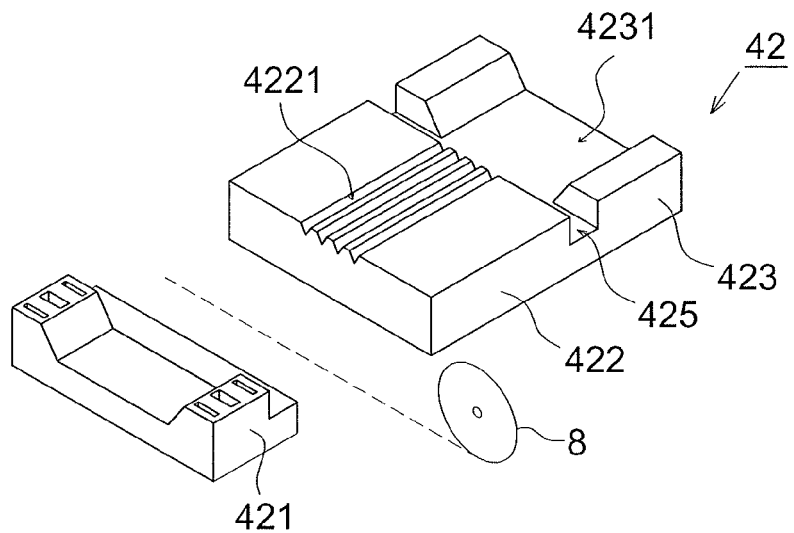

Please refer to FIG. 9A, next a cutting tool 8 (for example, but not limited to, a diamond blade) is used to remove the coupling part 421 (the removed part may or may not including the first connecting groove 424) from the second bearing member 42 (Step $S_{53}$); that is, in the final product of the optical engine assembly of the present disclosure, the second bearing member 42 does not include the coupling part 421.

Figure 9B:
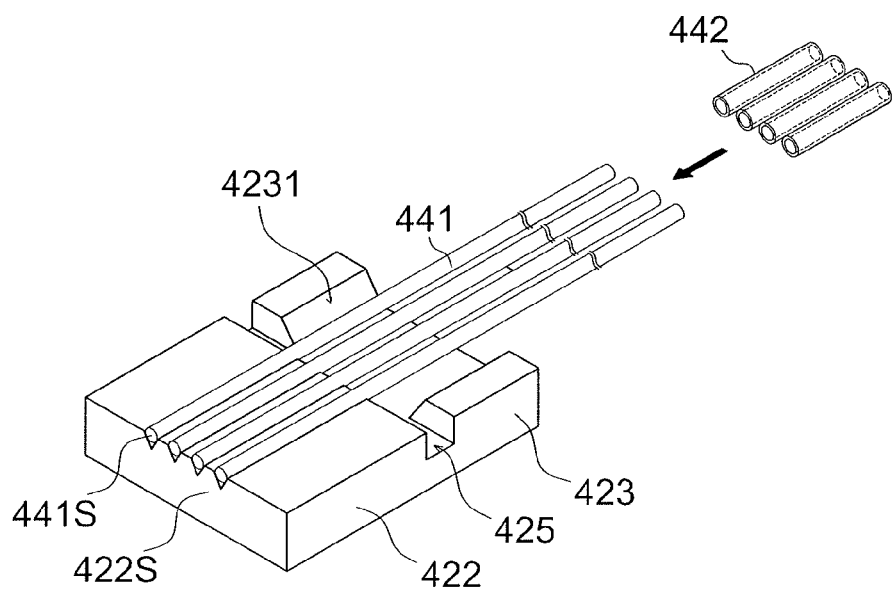

Please refer to FIG. 9B, next a plurality of optical waveguides 441 are placed inside the V-grooves 4221 respectively and the second groove 4231, and a fiber ribbon 442 is put on a section of the optical waveguides 441, wherein the exposure section of the optical waveguides 441 not surrounded by the fiber ribbon 422 is placed inside the V-grooves 4221 and the section of the optical waveguides 441 surrounded by the fiber ribbon 422 is preferably placed inside the second groove 4231 to be supported thereby (Step $S_{54}$). The front ends 441S of the optical waveguides 441 are substantially aligned with the front end 422S of the second fixing part 422 for being simultaneously ground later. In addition, although the fiber ribbon 422 is shown as four separated tube bodies herein, in other embodiments the fiber ribbon 422 may also be a single body having a plurality of through holes configured to put on the optical waveguides 441.

Figure 9C:
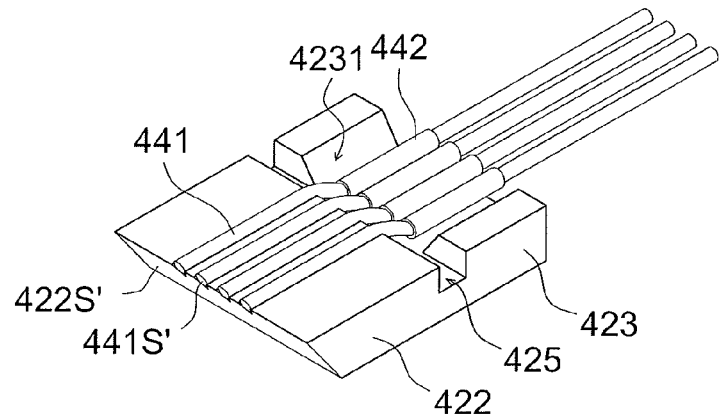

Please refer to FIG. 9C, next the front end 422S of the second fixing part 422 and the front ends 441S of the optical waveguides 441 are simultaneously ground to respectively form a 45-degree beveled front end 422S' and 45-degree beveled surfaces 441S' (Step $S_{55}$). Next the 45-degree beveled surfaces 441S' of the optical waveguides 411 are polished to form 45-degree beveled mirror surfaces (Step $S_{56}$). In this step one or a plurality of metal layers may be coated on the 45-degree beveled mirror surfaces to improve the reflectivity thereof. In other embodiments the 45-degree beveled mirror surfaces may not be coated with any metal layer.

Figure 9D:
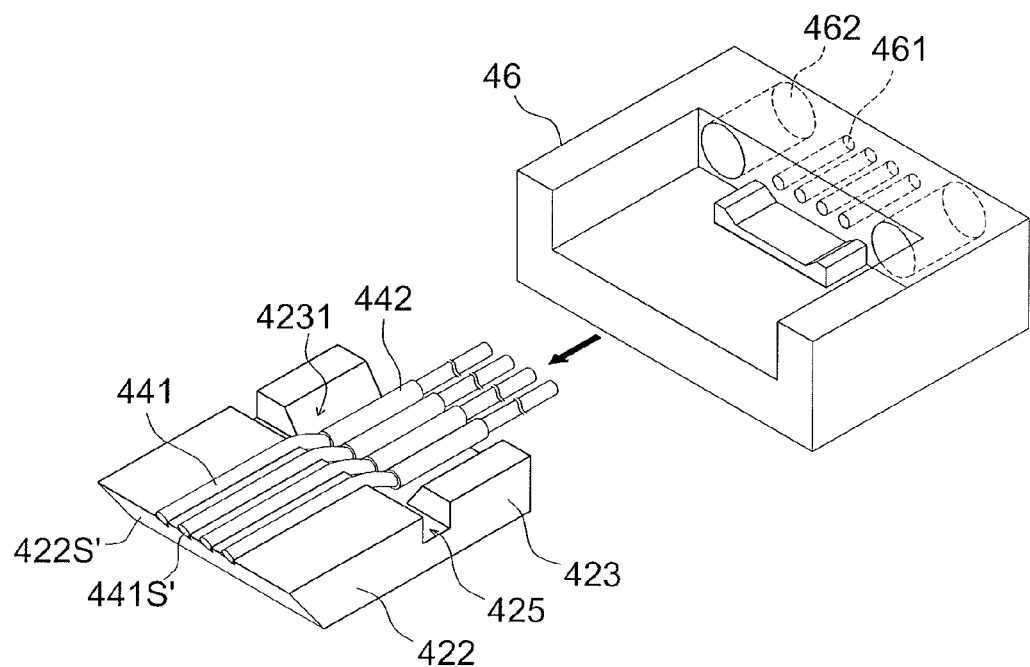
Figure 9E:
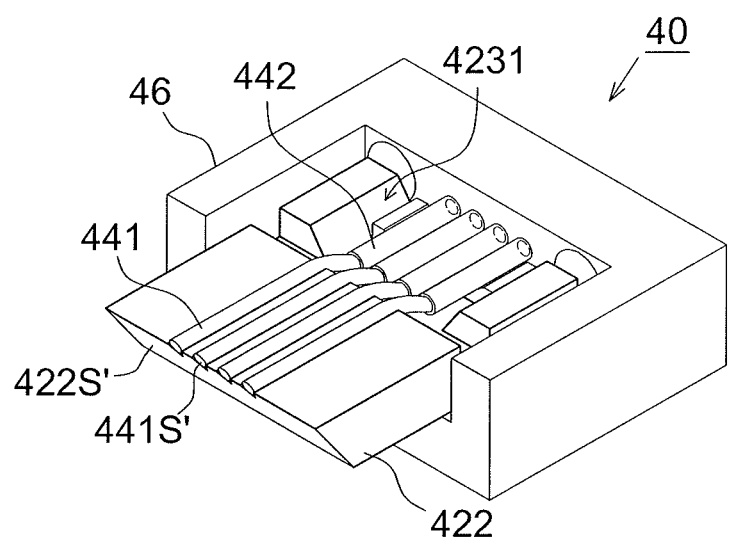

Please refer to FIG. 9D, next a mount 46 having a plurality of through holes 461 is provided to allow the end of the optical waveguides 441 away from the 45-degree beveled surfaces 441S' to penetrate through to be fixed, wherein the through holes 461 are aligned with the optical waveguides 441. In other words, the through holes 461 are aligned with the V-grooves 4221. Next, the end of the mount 46 away from the second bearing member 42 is polished to form the transmission unit 40 of the present disclosure (Step $S_{57}$) as shown in FIG. 9E. The mount 46 is configured to combine with an external optical connector to optically couple the optical waveguides 441 to external optical waveguides.

Next, the transmission unit 40 is covered on the active unit 30 (now the active unit 30 has been attached to the substrate 10) and the 45-degree beveled mirror surfaces 441S' of the optical waveguides 441 are aligned with the optoelectronic chips 341 of the active unit 34 to accomplish the optical engine assembly of the present embodiment (Step $S_{58}$) as shown in FIG. 4. In this step, as there are the positioning grooves 3212 formed on the active unit 30, the longitudinal alignment of the transmission unit 40 with the active unit 30 is accomplished by aligning a front edge of the 45-degree beveled front end 422S' of the second fixing part 422 of the transmission unit 40 with the positioning grooves 3212, and the transverse alignment and the rotation alignment have been accomplished in disposing the optoelectronic unit 34 as mentioned above. As the first bearing member 32 and the second bearing member 42 have symmetrical structures, as long as the alignment between the first bearing member 32 and the second bearing member 42 is accomplished, the alignment between the optical waveguides 441 and the optoelectronic chips 341 is accomplished simultaneously and high alignment accuracy can be achieved. In other embodiments, the active unit 30 may not include the positioning grooves 3212 and the alignment between the optical waveguides 441 and the optoelectronic chips 341 may be confirmed by detecting the maximum output power from the optical waveguides 441; and since the transverse alignment and the rotation alignment are not necessary in the structure without the positioning grooves, it also has a reduced alignment complexity compared to conventional structures.

It should be mentioned that in this embodiment, steps associated with FIG. 8 and FIGS. 9A-9E may be performed simultaneously, or the step associated with FIG. 8 may be performed previous to the steps associated with FIGS. 9A-9E.

As mentioned above, the conventional optical engine assembly has to perform a three-dimensional alignment simultaneously such that the manufacturing process is complicated and it is difficult to achieve high coupling efficiency. The present disclosure further provides an optical engine assembly (FIG. 4) and manufacturing method thereof (FIGS. 6-9E) that may significantly reduce the alignment complexity between optical waveguides and optoelectronic chips, and as the two bearing members respectively carrying the optical waveguides and the optoelectronic chips are made by the same process, it is able to effectively improve the alignment accuracy and the coupling efficiency.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical engine assembly, comprising:
   an active unit comprising a first bearing member and an optoelectronic unit,
      the first bearing member comprising a coupling part, a first fixing part and a first supporting part, wherein a first groove is longitudinally formed on the coupling part, a plurality of V-grooves are longitudinally formed on the first fixing part and connected to the first groove, and a second groove is longitudinally formed on the first supporting part and connected to the V-grooves;
      the optoelectronic unit being disposed in the first groove of the coupling part and comprising a plurality of optoelectronic chips; and
   a transmission unit comprising a second bearing member, a plurality of optical waveguides and a mount,
      the second bearing member comprising a second fixing part and a second supporting part, wherein the second fixing part and the second supporting part are respectively symmetric to the first fixing part and the first supporting part of the first bearing member, and a plurality of V-grooves and a second groove are respectively formed on the second fixing part and the second supporting part;

the optical waveguides being placed in the V-grooves and the second groove of the second bearing member, and a 45-degree beveled mirror surface being respectively formed at front ends of the optical waveguides and aligned with the optoelectronic chips of the optoelectronic unit;

the mount comprising a plurality of through holes to allow the optical waveguides to penetrate through.

2. The optical engine assembly as claimed in claim 1, wherein at least one pair of positioning grooves are further formed transversely on the coupling part of the first bearing member.

3. The optical engine assembly as claimed in claim 2, wherein the optoelectronic chips of the optoelectronic unit are aligned with the positioning grooves transversely.

4. The optical engine assembly as claimed in claim 2, wherein the optoelectronic chips are respectively aligned with the V-grooves longitudinally.

5. The optical engine assembly as claimed in claim 1, wherein the optoelectronic chips are respectively aligned with the V-grooves longitudinally.

6. The optical engine assembly as claimed in claim 1, wherein a section of the optical waveguides is surrounded by a fiber ribbon, the section of the optical waveguides not surrounded by the fiber ribbon is placed in the V-grooves and the section of the optical waveguides surrounded by the fiber ribbon is placed in the second groove.

7. The optical engine assembly as claimed in claim 1, wherein the V-grooves are connected to the first groove through a first connecting groove formed transversely.

8. The optical engine assembly as claimed in claim 1, wherein the V-grooves are connected to the second groove through a second connecting groove formed transversely.

9. The optical engine assembly as claimed in claim 1, wherein the second bearing member further comprises a connecting groove configured to separate the second fixing part and the second supporting part.

10. A manufacturing method of an optical engine assembly, comprising:

providing a first bearing member and a second bearing member identical with each other, wherein a coupling part, a fixing part and a supporting part are formed on both the first bearing member and the second bearing member, a first groove is longitudinally formed on the coupling parts, a plurality of V-grooves are longitudinally formed on the fixing parts, and a second groove is longitudinally formed on the supporting parts;

disposing an optoelectronic unit in the first groove of the coupling part of the first bearing member to form an active unit, wherein the optoelectronic unit comprises a plurality of optoelectronic chips;

removing the coupling part of the second bearing member;

providing a plurality of optical waveguides to be fixed in the V-grooves and the second groove of the second bearing member;

grinding front ends of the fixing part of the second bearing member and the optical waveguides to respectively form a 45-degree beveled front end and 45-degree beveled surfaces;

forming a 45-degree beveled mirror surface on the 45-degree beveled surfaces of the optical waveguides;

providing a mount comprising a plurality of through holes to allow the optical waveguides to penetrate through to form a transmission unit; and combining the transmission unit to the active unit and aligning the 45-degree beveled mirror surfaces with the optoelectronic chips.

11. The manufacturing method as claimed in claim 10, further comprising:

forming at least one pair of positioning grooves transversely on the coupling part of the first bearing member.

12. The manufacturing method as claimed in claim 11, wherein in the step of combining the transmission unit to the active unit, a front edge of the 45-degree beveled front end of the fixing part is transversely aligned with the positioning grooves.

13. The manufacturing method as claimed in claim 11, wherein in the step of disposing an optoelectronic unit, the optoelectronic chips of the optoelectronic unit are transversely aligned with the positioning grooves.

14. The manufacturing method as claimed in claim 11, wherein in the step of disposing an optoelectronic unit, the optoelectronic chips are longitudinally aligned with the V-grooves respectively.

15. The manufacturing method as claimed in claim 10, wherein in the step of disposing an optoelectronic unit, the optoelectronic chips are longitudinally aligned with the V-grooves respectively.

* * * * *